April 13, 1965  M. B. SAMPSON  3,177,782
PISTON AND ROD ASSEMBLY
Filed April 18, 1962

INVENTOR
MERRITT B. SAMPSON
BY
FOR Walls, Edgerton, Pyle & Fisher
ATTORNEYS

3,177,782
PISTON AND ROD ASSEMBLY
Merritt B. Sampson, Shaker Heights, Ohio, assignor to
The S-P Manufacturing Corporation
Filed Apr. 18, 1962, Ser. No. 190,521
3 Claims. (Cl. 92—255)

This invention relates to fluid cylinders and more particularly to mounting pistons on piston rods for such fluid cylinders.

This is a continuation-in-part of application Serial No. 24,990, filed April 27, 1960, by Merritt B. Sampson, under the title Piston and Rod Assembly. This prior application has been abandoned in favor of the present disclosure.

The better fluid power cylinders are assembled by either threading a piston rod into the bore of a piston and then holding the piston and rod threadably engaged by some anti-rotation device, or by threading just the rod and holding the piston engaged against a shoulder on the rod by means of a commercial nut. Welding, brazing, and integral piston and rod constructions are other known and used methods, but their use is considerably more limited.

Threading the internal bore of a piston is considerably more expensive than buying a commercially made nut, but commercial nuts which consistently have contact surfaces square with respect to the axis of the threaded openings of the nuts are virtually impossible to obtain. Whenever such surfaces are not perfectly square, a very disastrous strain is thrown into the piston rod. Furthermore, anti-rotation devices for the internally threaded type piston construction have consisted of such devices as angled pins, set-screws positioned in retaining recesses drilled half in the rod and half in the piston, and by the crude process of merely peening and battering the material at the junction line to prevent further rotation after the piston is installed.

Both piston rods and the piston members are subject to failure for many reasons. Each is an expensive item. Hence, if the members are separable it is necessary to replace only one of the members. With any anti-rotation device other than the mentioned commercial nut employed prior to this invention for holding internally threaded pistons, it is virtually impossible to remove the piston from the rod after any period of use. The angular pins and the set-screws become jammed to the extent that they cannot be removed, and obviously the peened surfaces cause such ragged edges that they seriously hamper successful removal.

Furthermore, if the commercial nut construction is employed to avoid the cost and the non-removability problem, then the overall cylinder construction must be longer than usual to accommodate the space necessary for the nut, or the piston must be cored out to house the nut. In this latter event, a weakness best described as "oil can" effect is inherent in the piston, causing a potential point of failure along the walls of the cored recess, and can be overcome only by once again making a piston longer than would otherwise be required and hence lengthening the entire device. Further, air pockets are sometimes trapped in the space provided in the piston for the nut. Such trapped air will adversely affect the performance of a hydraulic cylinder.

Another inherent limitation in previous proposals for so-called reusable pistons and rods is that it has not been possible to rate the piston for a capacity equal to some other piston and rod structures of comparable size. Commercial nuts, as suggested above, are not uniform and the result is a variance in the strength of the finished structure. Space and other limitations sometimes result in the use of nuts which do not have sufficient thread length to provide desired strength. The result of these factors is that such fluid motors must be rated below their intended capacity.

From the beginning of experience in making of such piston and cylinder construction to the present time, the industry has grappled with the problem of how to fasten a piston to a piston rod and simultaneously solve the following problems: (1) Provide a reliable piston-to-rod locking means that will not loosen under vibration; (2) Provide an interchangeable assembly that will allow any piston to be assembled with any rod; (3) Provide a repairable piston and rod construction which will not trap air; (4) Provide an assembly that when fastened together and torqued by tightening a threaded piston upon a threaded rod or tightening a securing nut against a piston, to the proper value to secure the piston upon the rod does not cause the shaft to bow to a degree that will not allow proper reciprocation of the shaft through suitable packing; (5) Provide an assembly that when the subject to high shock loads will not loosen or otherwise fail and contribute to accelerated failure of the entire device; (6) Provide a device with the foregoing characteristics which can consistently result in production of units of full calculated strength. The present invention overcomes the limitations of the prior proposals by using a shouldered piston rod that is threaded near one end, an internally threaded piston, and a coil in the threads of both to securely mount the piston in place.

Previously some proposals have been made for the utilization of a wire coil between threads of a piston and rod to lock the two together. These proposals, however, have been limited to very light applications because the coil will withstand only very limited loads without breakage.

It has now been discovered that if the shaft is equipped with a shoulder and the piston is torqued tightly against that shoulder the problem of coil breakage is completely overcome. Piston to rod connections of strength comparable to the strongest obtained in the past are now obtained with this construction.

Accordingly, one of the principal objects of this invention is to provide a work cylinder with a securely, but removably, mounted piston on a piston rod.

A more particular object of this invention is to provide a work cylinder with a wound wire coil to removably secure a piston to a shouldered rod.

Another object of the invention is to provide a cylinder with a repairable piston and rod construction which is strong and will not trap air.

Other objects and a fuller understanding of the invention may be had by referring to the following description and claims taken in conjunction with the accompanying drawings, in which:

Figure 1:
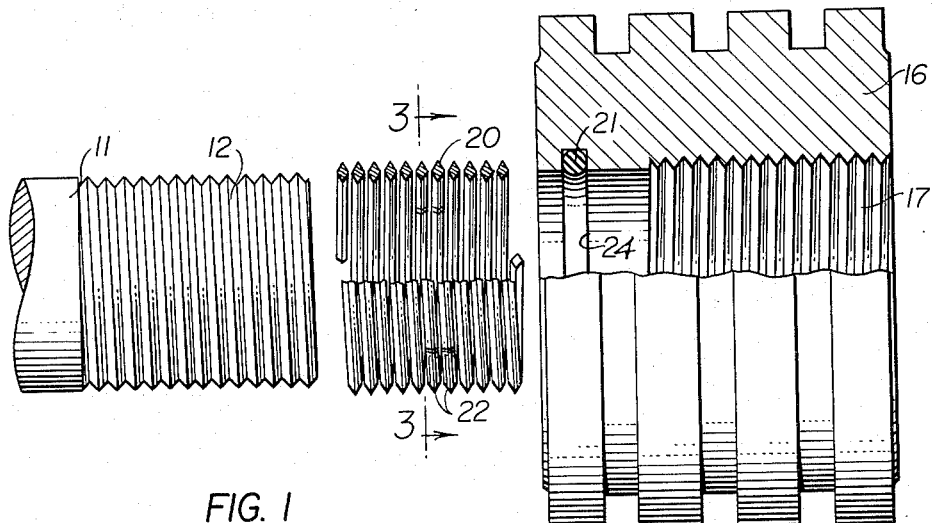
FIGURE 1 is an exploded side elevational view of a piston, a piston rod, and wound wire mounting coil.

Referring now to the drawings, a fluid cylinder is provided which includes a housing indicated by the reference character 10. A piston rod 11 projects through a rod aperture 4 into a cylindrical chamber 15 in the housing 10. A portion of the rod 11 is externally threaded near one end as indicated by the reference character 12.

A generally cylindrical piston 16 is positioned in the chamber 15. The piston has a through axial bore 17. The bore is threaded at 18 adjacent one end to engage the rod threads 12. It is quite within the ordinary skills of the machine tool practice to provide the threaded portion 12 and the bore threads 18 with the well defined screw threads which are orientated accurately with the respective axes of the rod and the bore through the piston 16.

A cylindrical wire coil 20, having a diamond-shaped cross-sectional configuration corresponding generally to the shape of mated threads 12, 18 is employed as the means for joining the piston to the rod according to the concepts of this invention. The inner surfaces of the convolutions of the coil reside in the groove of thread 12, and the outer surfaces reside in the bore thread 18. An O-ring 21 is positioned in groove 24 within the piston to seal against oil leakage through the bore 17.

Figure 3:
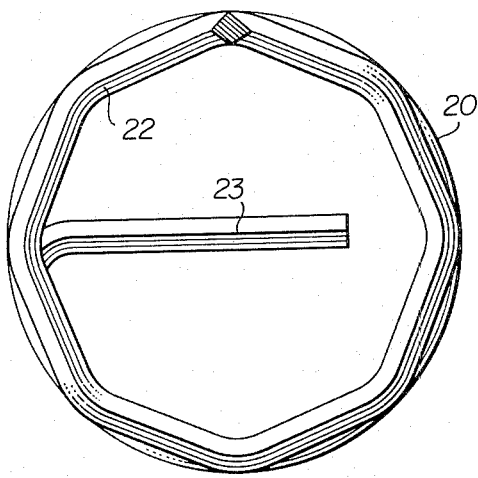
FIGURE 3 is a sectional view of a wound wire mounting coil.
Figure 4:
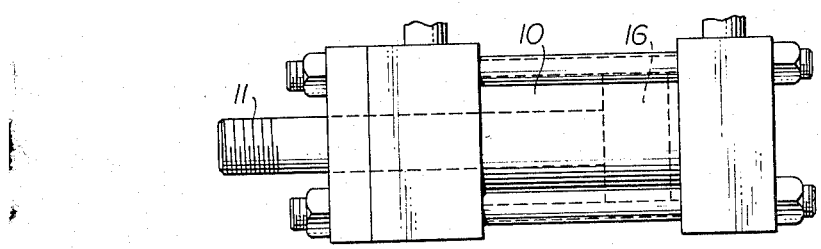
FIGURE 4 is a partially sectioned schematic view of a work cylinder with a piston and rod in piston.

The coil 20 has a number of convolutions 22 which are generally octagonally shaped as shown in FIGURE 3. The coil, because of this octagonally shaped series of convolutions, must be placed in position by means of a special tool. An axially bent arm 23 formed at one end of the coil is provided in order that the installation tool may grip and thread the coil into the threaded axial bore 17. Although not shown in the drawings because of the position of the illustrations, it is convenient to provide a notch in the coil near the juncture of the arm 23, in order that this arm may be broken off after the coil is inserted by the installation tool and hence will not interfere with later assembly of the piston and rod.

With the coil 20 thus positioned in the bore 17, the inner surfaces of the convolutions of the coil define external threads to enable the threaded engagement of the piston and coil assembly upon the rod. Because of the noncircular nature of the convolutions 22 formed in the coil, a substantial force is needed to remove the piston. Hence, the piston remains firmly mounted on the rod under normal usage without the need of a lock nut or washer.

Figure 2:
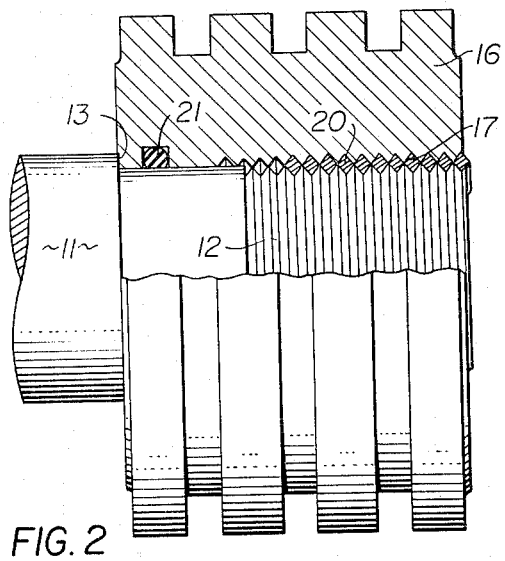
FIGURE 2 is a sectional perspective view of the piston mounted on a piston rod with the wound wire mounting coil joining these members.

In order to employ this illustrated and described means of mounting the cylinder and piston together, it has been found essential that the piston be torqued to a considerable degree against an abutment surface and to place the threaded surfaces and the coil under a considerable preload. If this preloading is not employed, the assembly is subject to rapid degeneration in use. In FIGURE 2 it will be seen that the shaft is provided with a turned shoulder 13 against which the piston may be brought into abutment. The piston and shaft are tightened until abutment against this shoulder by the piston places all of the threads and the coil under considerable strain. Customary pre-loading in the fluid cylinder industry is obtained by torquing pistons against shaft shoulders to place the shaft under a strain of about sixty-five to eighty percent of its yield point. Ideally, if the material from which the rod and piston are made is uniform the cross sectional area of the shoulder 13 will equal the cross sectional area of the rod threaded portion 12 to provide a work cylinder of maximum capacity.

Since the means to lock the piston and rod together is the coil 20, the piston need not be cored as is the case with the lock nut. Accordingly, the piston has flat end surfaces 30, 31 against which fluid supplied by ports 32, 33 acts.

One of the outstanding advantages of this invention resides in the stability of this mounting together with its resistance to "freezing" or "jamming" under normal use. It has been found that a piston mounted on a rod according to this invention has little or no tendency to freeze or jam on the rod, and can be removed from the rod without damaging the rod, even after long and continued use. Thus, a worn piston can be removed from its rod, and a new piston replaced securely on the same rod at the point of installation of the cylinder.

Although the invention has been described with some degree of particularity, it is believed that it essentially comprises an externally threaded piston rod with a wound wire coil engaged with the threads, and a piston threaded onto the coil.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. In a fluid cylinder adapted for repetitive, high speed, reciprocal cycling, and having a housing defining a cylindrical chamber and inlet and outlet ports communicating with the chamber, said housing including a rod aperture communication with the chamber, the combination of:
   (a) piston rod disposed in the aperture with one end disposed within the chamber, said piston rod being externally threaded near said one end;
   (b) a resilient, convoluted, wire coil wound on the thread of said rod over a length of the thread substantially equal to the diameter of the rod threads, the outer surface of the convolutions of said coil defining a thread, the inner surface of the convolutions of the coil being disposed in the groove of the thread on said rod;
   (c) a double-acting piston having an axial, threaded bore threadably engaged with said coil;
   (d) said rod including a radially extending shoulder near the threaded portion, the area of the shoulder being substantially equal to the cross sectional area of the rod threaded portion;
   (e) the piston including a complemental surface torqued into tight, preloaded, abutting contact with substantially the entire surface of the shouder; and,
   (f) certain of the convolutions of said coil including locking surfaces preventing relative rotation of the coil and piston with respect to said rod, and maintaining said tight, preloaded, shoulder to surface abutment.

2. The device of claim 1 wherein the ends of the piston are flat.

3. The device of claim 1 wherein said locking surfaces on the coil are non-circular portions of central ones of said convolutions.

References Cited in the file of this patent

UNITED STATES PATENTS

| | | |
|---|---|---|
| Re. 23,041 | Smith | Sept. 21, 1948 |
| 2,152,681 | Caminez | Apr. 4, 1939 |
| 2,665,931 | Vegren | Jan. 12, 1954 |
| 2,755,699 | Forster | July 24, 1956 |
| 2,874,741 | Brancato | Feb. 24, 1959 |
| 2,903,308 | Barnhart | Sept. 8, 1959 |
| 3,005,669 | Nunnemacher | Oct. 24, 1961 |